United States Patent
Barmatz et al.

[11] Patent Number: 5,847,355
[45] Date of Patent: Dec. 8, 1998

[54] PLASMA-ASSISTED MICROWAVE PROCESSING OF MATERIALS

[75] Inventors: Martin Barmatz, La Crescenta; Tzu-yuan Ylin, Pasadena; Henry Jackson, La Verne, all of Calif.

[73] Assignee: California Institute of Technology, Pasadena, Calif.

[21] Appl. No.: 583,690

[22] Filed: Jan. 5, 1996

[51] Int. Cl.$^6$ .................................................. B23K 10/00
[52] U.S. Cl. .............................. 219/121.59; 219/121.43; 219/121.38; 219/678
[58] Field of Search ................... 219/121.43, 121.45, 219/121.44, 121.47, 121.59, 121.38, 736, 744, 678, 679

[56] References Cited

U.S. PATENT DOCUMENTS

| | | | |
|---|---|---|---|
| 4,061,991 | 12/1977 | Hamid et al. | 333/22 R |
| 4,822,966 | 4/1989 | Matsubara | 219/10.55 M |
| 4,838,915 | 6/1989 | Hassler | 65/2 |
| 4,900,894 | 2/1990 | Tanaka et al. | 219/121.59 |
| 4,963,709 | 10/1990 | Kimrey, Jr. | 219/10.55 R |
| 5,118,917 | 6/1992 | Van Krieken et al. | 219/121.66 |
| 5,648,007 | 7/1997 | Reslinger et al. | 219/383 |
| 5,653,775 | 8/1997 | Plovnick et al. | 204/157.43 |

*Primary Examiner*—Mark H. Paschall
*Attorney, Agent, or Firm*—Fish & Richardson P.C.

[57] ABSTRACT

A microwave plasma assisted method and system for heating and joining materials. The invention uses a microwave induced plasma to controllably preheat workpiece materials that are poorly microwave absorbing. The plasma preheats the workpiece to a temperature that improves the materials' ability to absorb microwave energy. The plasma is extinguished and microwave energy is able to volumetrically heat the workpiece. Localized heating of good microwave absorbing materials is done by shielding certain parts of the workpiece and igniting the plasma in the areas not shielded. Microwave induced plasma is also used to induce self-propagating high temperature synthesis (SHS) process for the joining of materials. Preferably, a microwave induced plasma preheats the material and then microwave energy ignites the center of the material, thereby causing a high temperature spherical wave front from the center outward.

24 Claims, 9 Drawing Sheets

Schematic of magnetron system.

Temperature and transmitted power for slow hearing rate (x = 0).

Temperature and transmitted power for fast hearing rate (x = 0).

1mm

Sample cross-section
(fast heating, x = 0).

1mm

Sample cross-section
(slow heating, x = 0).

1mm

PLASMA-ASSISTED MICROWAVE PROCESSING OF MATERIALS

ORIGIN OF INVENTION

The invention described herein was made in the performance of work under a NASA contract, and is subject to the provisions of Public Law 96-517 (35 USC 202) in which the Contractor has elected to retain title.

FIELD OF THE INVENTION

The present invention relates to improvements in processing materials using microwave energy. More specifically, the present invention teaches techniques of using a microwave assisted plasma to enhance microwave heating and joining.

BACKGROUND AND SUMMARY

Microwave processing of materials has been typically limited to strongly microwave-absorbing materials. Strongly microwave absorbing materials include certain ceramics, semiconductors, and others. Many materials, including bulk (i.e. not film) metals, are poor microwave absorbers. Metals absorb microwaves in their skin depth—typically the order of a micron in thickness. The prior art has not used these poor microwave absorbers efficiently. This has limited the use of microwaves to process materials to a rather narrow class of strongly microwave absorbing ceramic materials.

This limitation has largely prevented microwaves from being used for many important applications—including forming wear-resistant materials in future engine valve components. Such components are often compromised at engine temperatures exceeding 650° C. The additional expense of new high temperature metal valve components and their increased failure rates have caused automobile valve manufacturers to evaluate the advantages of using high temperature ceramic or ceramic/metal composite components. Studies by the automobile industry have shown that one of the most economically efficient valve designs would use a ceramic valve head attached to a metal shaft. The development of an economical ceramic to metal joining method, however, has proved to be a formidable task.

The present invention provides an enabling technological breakthrough in microwave joining of ceramics and ignition of the self-propagating high temperature synthesis (SHS) process. The application of a new plasma assisted technique has the potential of economically joining high temperature ceramics to metals by igniting the SHS process in an interlayer between the two materials. The interlayer can be a functionally graded material which has special properties and enables special advantages in operation. An alternative microwave torch technique uses a microwave plasma to ignite a torch, and uses that torch- ignited material to heat another material to melting.

A material's ability to absorb microwaves depends primarily on its imaginary dielectric constant, $\in''$. Larger $\in''$ indicates that the materials are better absorbers of microwave energy. In general, $\in''$ increases with temperature. The result is that most materials become reasonably good absorbers of microwave energy at higher temperatures (approximately 800° C. in the materials used in this embodiment).

Commercial microwave processing of poor microwave absorbing materials, therefore, has required that the materials be heated from room temperature to some critical temperature, e.g. around 800° C. Conventional microwave heating techniques have been used in an attempt to preheat many different materials. The material is first placed in a high electric or magnetic field position in a microwave cavity depending on whether the material is insulating or conducting. Then, the microwave power is turned on. Unfortunately, the electromagnetic field strengths attained, even for optimum power transfer conditions, are not usually sufficient to heat materials with low $\in''$.

Hybrid heating techniques have been developed using conventional radiant furnaces in addition to microwaves to preheat and process materials. However, these hybrid methods are expensive and slow. The present inventors recognized that these techniques are not commercially economical.

The inventors recognized the desireability of microwave heating many other materials beyond the small set of microwave absorbing materials. It is hence an object of the present invention to describe an embodiment which uses microwaves to heat at least one poor microwave absorbing material. It is another object of the present invention to use microwaves to heat and join materials, at least one of which is poorly microwave absorbing.

Another aspect of the present invention contemplates joining materials to one another using a microwave plasma and volumetric heating effect, e.g. a metal rod to a ceramic rod, a metal rod to another metal rod, or a ceramic rod to another ceramic rod. The techniques of the present invention use special plasma techniques, whereby a plasma is ignited by microwave energy, and the radiant heat from the plasma is used to preheat the material.

The first embodiment of the present invention uses a microwave induced plasma to controllably preheat materials that are poorly microwave absorbing. Poorly microwave absorbing materials include bulk metals (e.g. metals which are thicker in dimension than a few mm) and other similar materials where microwaves absorb primarily within a relatively small skin depth of the material.

A predetermined position at the tip of a rod or tube of a poor microwave absorber such as high purity alumina, quartz, or sapphire can be heated to melting at low microwave energy levels using this plasma enhanced technique. This method can also be used to produce a microwave torch for heating a variety of other materials such as metals.

In recent years, there has been a renewed interest in combustion synthesis reactions, commonly called self-propagating high-temperature synthesis (SHS). These SHS reactions are an attractive, energy efficient approach to the synthesis of high temperature composite materials and metastable phases. Generally, the SHS process is ignited at the surface of the material by thermal radiation. The ignition occurs when the material surface gets sufficiently hot to essentially combust and produce an exothermal reaction. The heat generated by the exothermic reaction fuels the continuing reaction. The reaction continues as a combustion wavefront which propagates through the entire volume in seconds.

The thermal energy needed to ignite the reaction can come from a laser beam or a heating coil situated close to the sample surface. Alternatively, the entire sample can be heated to the ignition temperature in an isothermal furnace. In these types of combustion synthesis methods, a temperature gradient is produced in the material with the surface always hotter than the center. This has led to certain limitations in the SHS processing.

In "Unique Application of Microwave Energy to the Processing of Ceramic Materials", Ahmad et al, J. Microwave Power, Vol 26, no. 3, 1991; it was suggested that combustion synthesis could be performed with microwave energy. Ahmad recognized that microwave energy avoided certain of the previous SHS limitations, including better control of the propagation wavefront. However, the Ahmad system did not suggest any efficient ways of using microwaves to heat materials, especially poor microwave absorbing materials.

It is accordingly an object of the present invention to use a plasma and microwave energy to carry out a self-propagating reaction where the ignition occurs in a location other than the surface of the element.

An important application of the system of the present invention is in joining materials of dissimilar types. These materials, once joined, may have different coefficients of expansion which could weaken the eventual joining area. A special technique of the present invention obviates this problem by using a material which has physically different material content as a function of its length. For example, there can be a ceramic at one end, and metal at the other end. This functionally graded material can be used to join dissimilar materials, obtaining better bonds to both, and obtaining a better interface between the bond areas.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

The first embodiment of the present invention describes a new, more efficient, hybrid heating technique. The technique is a hybrid in the sense that it uses two different kinds of heating techniques. A microwave-induced plasma is used to radiantly preheat the sample surface. Microwave energy is also used to volumetrically heat the sample interior. This hybrid technique heats the sample to elevated temperatures at which microwave processing of poor microwave absorbing materials becomes possible. The plasma is no longer needed at these elevated temperatures, and could be terminated.

The term poor microwave absorbing is used herein to refer to materials that have a low $\in''$; $<0.1$, more preferably less than 0.01, and most preferably less than 0.001. In the case of metal-like materials there is a very strong absorption of microwave radiation within a small skin depth.

The present embodiment uses a plasma enhanced heating technique to supplement the microwave heating at lower temperatures. The plasma sufficiently raises the temperature of the material so that microwave energy can efficiently continue to heat the material to higher processing temperatures.

Figure 1:
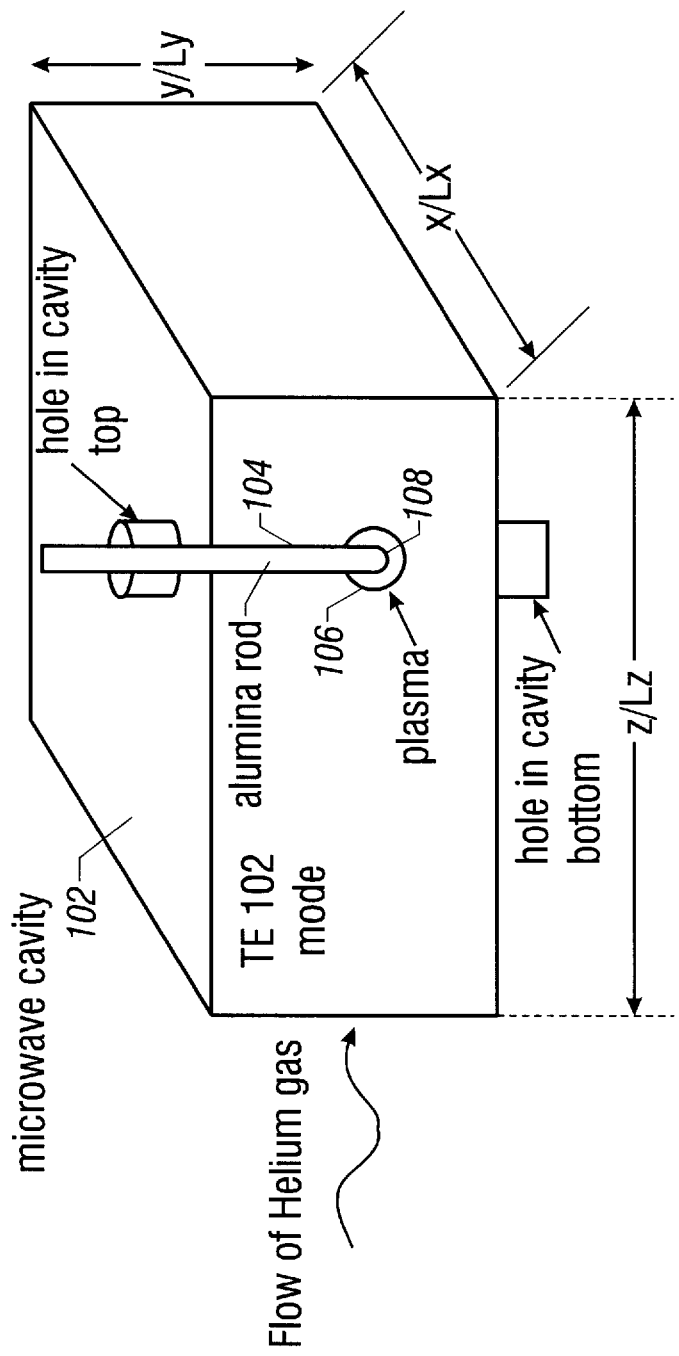
FIG. 1 shows a first embodiment of the plasma processing technique of the present invention.

FIG. 1 shows a microwave plasma 100 in a microwave cavity 102. The microwave plasma is ignited at a high electric field position in cavity 102. The term plasma ignition is used herein to connote an energy change being applied to the surrounding material, e.g., the helium gas, and to indicate that some aspect of the surrounding material has been excited to transition to a higher energy state ("plasma").

High electric fields are also produced at sharp edges on objects placed within an excited cavity. The present invention combines these two effects by placing an object 104 with sharp edges 106 at a preferred position 108 in the cavity. Preferred position 108 is preferably a position that corresponds to a maximum field strength of the excited microwave cavity mode.

The plasma ignition is further enhanced by the flowing of a gas that easily dissociates in an electric field.

FIG. 1 shows exciting a rectangular waveguide cavity in the TE102 mode that has electric field maxima along the lines defined by $z/Lz=\frac{1}{4}$ and $\frac{3}{4}$ and $x/Lx=\frac{1}{2}$. The workpiece in this embodiment is preferably a cylindrical alumina ($Al_2O_3$) rod of high purity, preferably 99.8% purity, placed along one of these maximum E field lines, here at $z/Lz=\frac{3}{4}$ and $x/Lx=\frac{1}{2}$. High purity alumina is a very poor room temperature microwave absorber, and has previously been very difficult to heat up from room temperature to the desired microwave absorbing temperature in this way. The rod is placed with its end inserted approximately half way down the y axis so that $y/Ly=\frac{1}{2}$. Helium gas or some other easily dissociating gas slowly flows through the cavity, e.g., at around 100 ml/min. Importantly, no special requirements of pressure are needed for the chamber—it need not be gas tight, and can be operated at ambient pressure.

This specific arrangement allows a plasma to be ignited around the tip of the rod using only 60 watts of transmitted power into this cavity. The microwave power to the cavity is supplied through a microwave waveguide. Transmitted power for this application is defined as the difference between the microwave energy in the waveguide going toward the cavity ("forward power") and the microwave energy in the waveguide moving away from the cavity ("reflected power"). This rod is sufficiently heated that it acts as a plasma torch that can be used to heat other materials inside the cavity.

Figure 2:
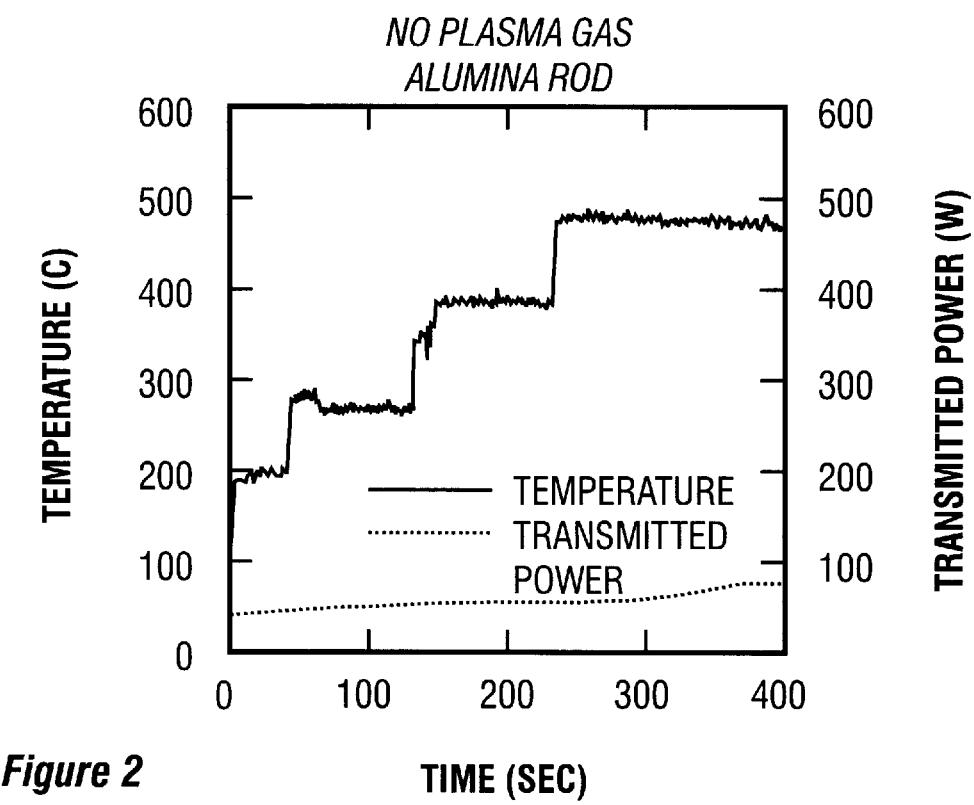
FIG. 2 shows a time-temperature plot for a system with no plasma therein.

The enhancement gained from heating a low-absorbing alumina rod using a plasma is illustrated in FIGS. 2–5. Each of these graphs correspond to the embodiment setup shown in FIG. 1. The time-temperature heating curve for a 0.2" diameter 99.8% pure alumina rod from Coors Ceramic is shown in FIG. 2 with no He gas in the cavity. The temperature of the tip of the rod was measured using a non-contact Everest Interscience IR thermometer (range −30°–1100° C.). FIG. 2 shows that the sample temperature rises very slowly as the transmitted power is increased to approximately 500 watts. The maximum temperature attained with no plasma was 65° C.

Figure 3:
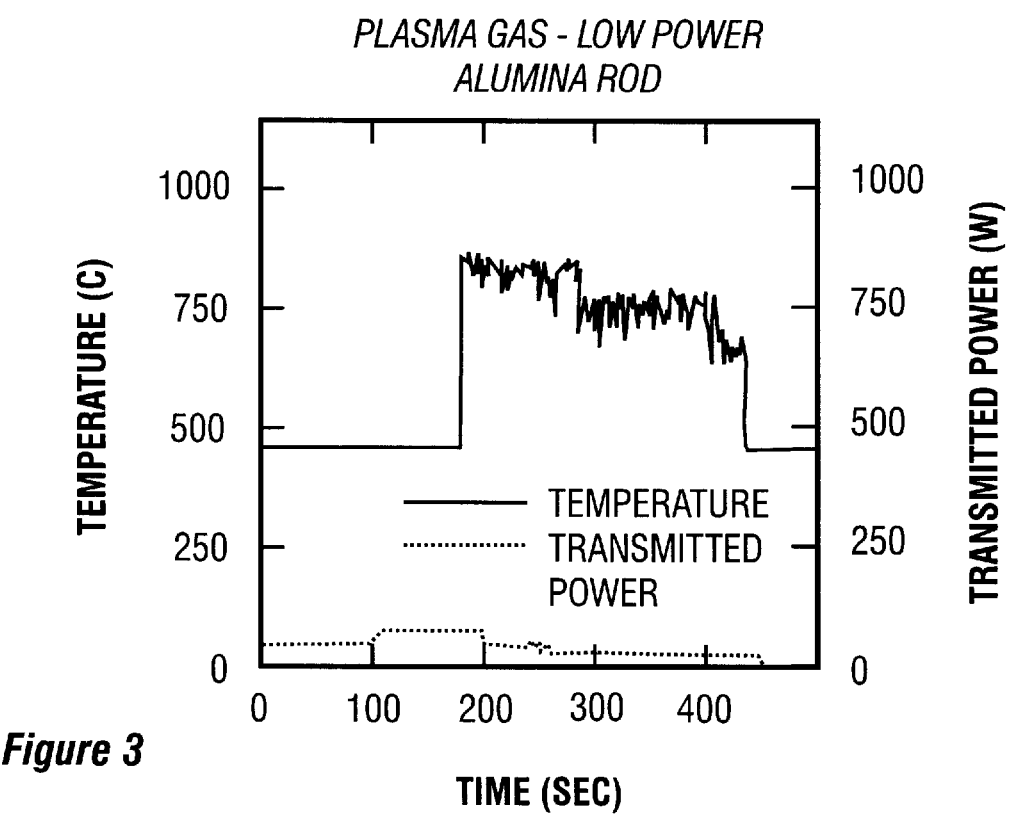
FIG. 3 shows a time-temperature plot for a system with a helium plasma flowing.
Figure 4:
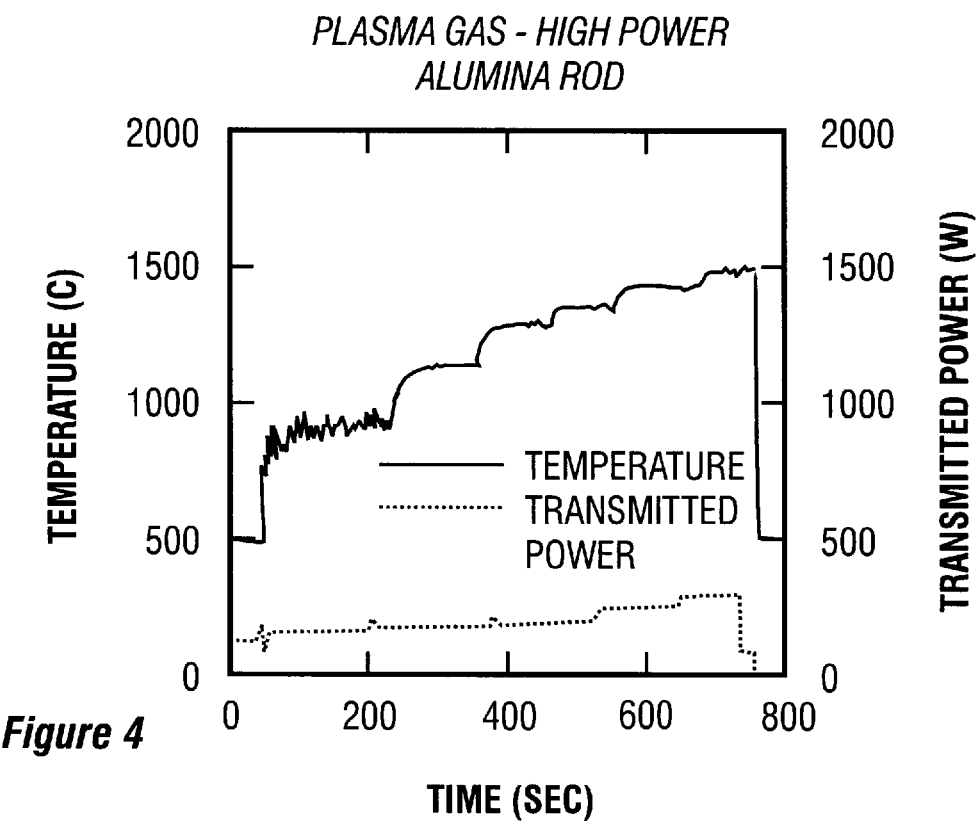
FIG. 4 shows the time-temperature heating curve when the transmitted power is increased to higher levels.
Figure 5:
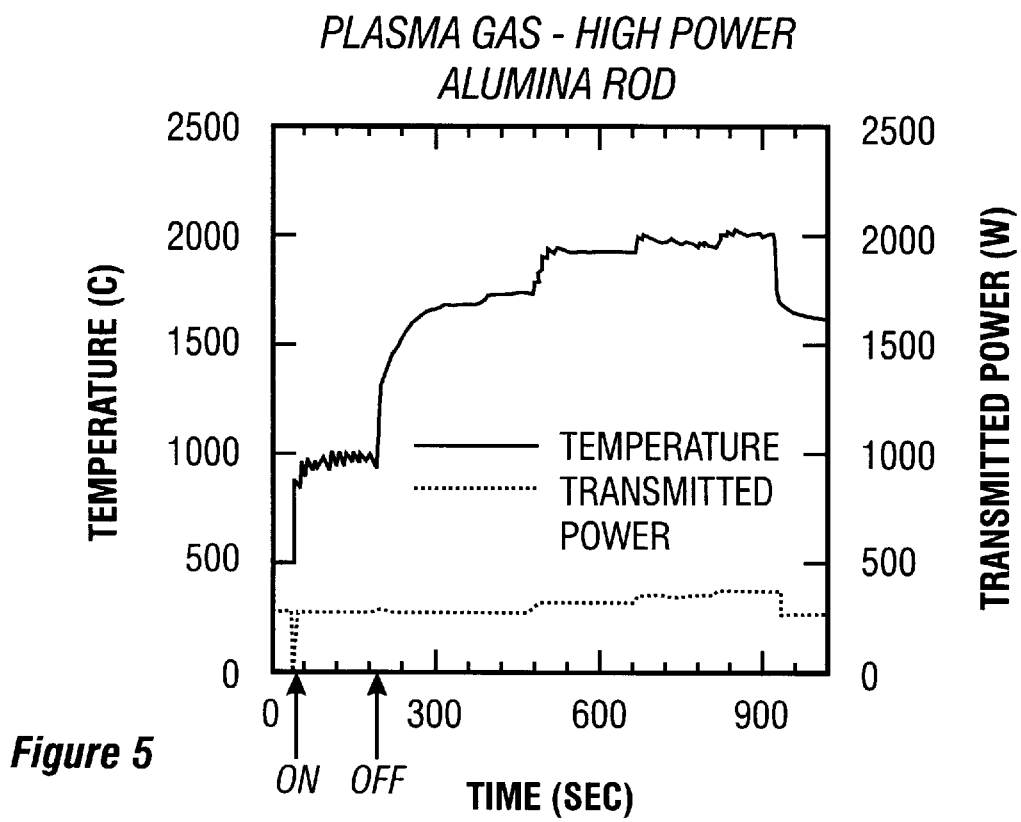
FIG. 5 shows how this plasma enhanced technique is applied.

FIGS. 3–5 show the temperature of the tip of the rod, measured using an Accufiber non-contact pyrometer (range 500°–2400° C.). When the He gas that will form the plasma is flowing through the cavity and the microwave power is slowly increased, the time-temperature heating curve shown in FIG. 3 is obtained. The plasma is excited suddenly using only 60 watts of transmitted power. The initially excited plasma quickly heats the tip of the rod to a temperature of 900° C. Once the plasma is excited, lower rod temperatures can be attained by decreasing the transmitted power. The He plasma is extinguished when the transmitted power is reduced below 15 watts.

FIG. 4 shows the time-temperature heating curve when the transmitted power is increased to higher levels. The initially excited plasma again heats the tip of the rod to approximately 900° C. The temperature of the tip of the rod can be increased further to 1550° C. by increasing the transmitted power to 430 watts. When the microwave power is turned off at the end of the 1550° C. plateau, the temperature of the tip of the rod cools very quickly. While the He plasma can quickly heat up the alumina rod tip to relatively high temperatures, 1600° C. for 500 watts, it cannot heat the tip to melting (approximately 2000° C.) without using significantly higher transmitted power, e.g. >>500 watts.

High purity alumina has a room temperature imaginary dielectric constant of $\in$"≈0.004. This is a very low value and very high microwave power levels are required to heat this material. However once the He plasma heats the alumina to 900° C.; $\in$" becomes 0.09. At this temperature, the material can more easily absorb microwave energy.

The inventors found, moreover, that the plasma surrounding the rod tip absorbs most of the microwave energy in the cavity and hence also partially shields the rod from the remaining microwave energy. This minimizes the ability to volumetrically heat the sample. A special technique is used to avoid this problem and heat the sample to higher temperatures. After the rod tip is sufficiently heated by the plasma, the He plasma is extinguished by turning off the He gas. FIG. 5 shows how this plasma enhanced technique is applied. The transmitted power is initially set to 200 watts. After about 45 seconds, the plasma is excited and the sample reaches a steady state plateau of around 900° C. after 120 seconds. The He plasma gas is then turned off at 200 seconds and the rod tip quickly heated to above 1600° C. by direct absorption of microwave energy. Further increases in the transmitted microwave power to 300 watts heat the tip of the alumina rod to melting (approximately 2000° C.).

Many additional modifications of the above techniques are contemplated. The tips of the samples used to excite the plasma need only to have a sharp area, and can overall have many shapes, including cylindrical, rectangular, conical, etc. For example, the present inventors have successfully ignited the plasma using a conical tip on the 0.2" diameter sapphire rod.

This technique can also be used on any of a number of different materials. To obtain the maximum benefit from the techniques of the present invention, these materials are at least partially poorly microwave absorbing. However, these plasma techniques can also be used to advantage when used on good microwave absorbers.

The inventors of the present invention have successfully used the techniques of the present invention on a variety of materials. For example, the present inventors have melted thin quartz rods (Tm=1610° C.), sapphire rods and fibers (Tm=2072° C.), and have sintered alumina nitride samples (Ts=1850° C.) using this plasma enhanced technique.

The heating operation can also be applied to join materials ("Plasma Enhanced Microwave Joining"). The inventors have developed several ways that plasmas can be used to enhance microwave joining of ceramics and other materials.

Figure 6:
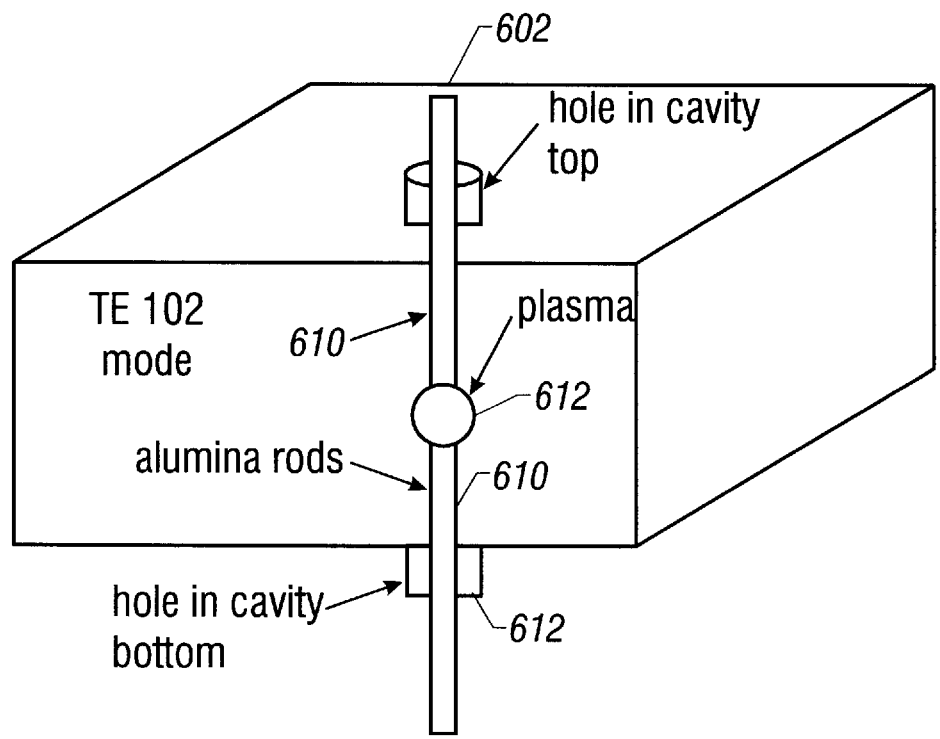
FIG. 6 shows an alternative plasma embodiment in which different rods are inserted through respective holes in the cavity.

FIG. 6 shows an alternative embodiment in which a first ceramic rod 600 is inserted through a first hole 602 in the cavity top 604. A second ceramic rod 610 is inserted through the opposite hole 612 below the first rod after the He plasma has been ignited. The second ceramic rod 610 is positioned to leave a gap 612 of approximately ½" between the rods. The plasma 614 will become locked in the gap between the surfaces of the rods due to the concentrated microwave field in the gap and will continue to absorb microwave power during that time. The microwave induced plasma is localized in the gap. Localizing or maintaining (e.g., locking and trapping) a microwave induced plasma without heating the materials outside the gap allows greater efficiency and control of the heating and joining process. After a short time, both rod surfaces will be preheated by the plasma to temperatures of approximately 1000° C. The Helium gas is then turned off allowing the now-heated rod surfaces to more efficiently locally absorb microwave energy. The rod surfaces, e.g., tips of the rods, will rapidly begin absorbing the microwave energy to allow them to quickly reach their melting temperatures.

After reaching the melting temperatures, the rods are pushed together with at least 10 lbs of force using a force-controlled pneumatic unit to form a joint. The joined rods were then cooled at a controlled rate by gradually reducing the microwave power. All samples were tested to failure in a four-point bend fixture. The fixture design was consistent with ASTM standard C 158-72. The strength tests were performed at a constant crosshead speed of 0.002 cm/s in a laboratory environment on an Instron testing machine (Instron Universal Testing Machine: Canton, Mass.) with a calibrated load cell.

This method has enabled joint strengths of approximately 130 MPa at room temperature to be achieved in less than three minutes using high purity 99.8% alumina rods.

Yet another joining approach uses the basic system shown in FIG. 6, and initially inserts both rods into the cavity before turning on the microwave energy. The gap between the rods is made very small; approximately ¹⁄₁₆". This time a plasma will form inside the gap near its center, thus the plasma size is much smaller than in the first approach above.

Therefore, the center of the rods will be heated to temperatures near 1000° C. leading to a temperature gradient across the surface of the gap. When the He plasma is turned off, the microwave field will quickly melt the center of the tips of the rod. The gradient ensures that the center of the tips are preferably melted. When melting occurs, the rods are pushed together to form the joint. With this approach, joint strengths of up to 50 MPa at room temperature have been achieved using high purity alumina rods.

Another modification preheats one of the materials using the microwave plasma until it gets hot enough to be used as a torch. That hot material is then used to heat the other of the materials.

Many other modifications of this technique are also possible taking advantage of these techniques for using a plasma to join ceramics and using the advantageous features of the embodiments described above.

This enhanced plasma heating technique also has applications in ceramic to metal joining. In the ceramic to metal technique, the plasma is preferably used to heat the tip of the ceramic rod first. The metal rod is then inserted, leaving a gap between the pieces. The plasma can then be turned off to further heat the ceramic using the microwave energy. The ceramic rod now behaves like a microwave torch and can heat and melt the metal rod. The inventors have already demonstrated that a stainless steel rod (0.2" diameter) can be heated to melting (approximately 800° C.), using a plasma-heated alumina rod of 0.2" diameter. The final joining procedure pushes the rods together after they have been melted.

Depending on the materials to be joined, it may be necessary to include an interlayer of an appropriate material between the rods to strengthen the joint. This interlayer material will depend on the properties of the materials to be joined and in particular the thermal expansion coefficient. If the thermal expansion properties are too different, the interlayer can be used to interface the different materials to one another.

The plasma techniques of the present invention, and the basic setup of FIG. 6, can also be used for Plasma Enhanced Microwave Fiber Pulling. In this embodiment, the He plasma is similarly used to initially heat one rod. After heating, the He plasma gas is turned off. The transmitted microwave power in the cavity is then increased until the tip is melted.

A ceramic fiber is inserted into the cavity 602 through the opposite hole 612 until it touches the molten pool and begins to melt back. The ceramic fiber is pulled from the tip at an appropriate constant speed related to the viscosity and other properties of the specific fiber material. This allows drawing a long continuous fiber. The present inventors have verified this approach using a quartz feed rod of 0.125" diameter that was heated to melting (Tm=1610° C.).

In the above embodiment, the tip of the rod is preferably positioned in a symmetrical electric field position. This facilitates the molten tip being isotropically heated. By isotropic heating, we mean that the sample is uniformly heated from all directions. There may be a gradient within the material, but the gradient will be an isotropic gradient. This approach is advantageous compared to other heating techniques in which isotropic heating is not obtained. For example, if the tip is heated with laser beams, e.g., one laser beam on each side of the tip, undesirable non-uniform, non-isotropic temperature gradients are obtained.

Figure 6A:
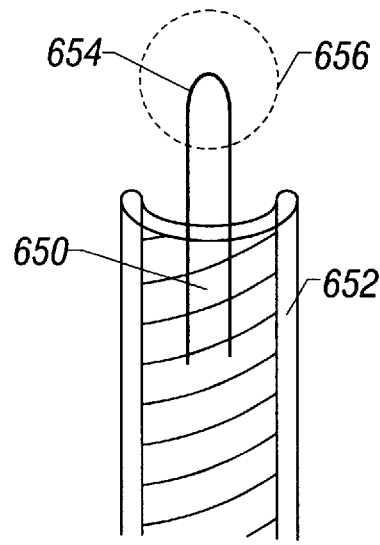
FIG. 6A shows a shielding embodiment which allows a tip of the workpiece to be preferentially heated by the microwave.

Another application of this system is described with reference to FIG. 6A. The previous embodiments have described using microwaves and plasma to preferentially heat an area, e.g., the tip, of materials which are poor microwave absorbers. Sometimes, however, it may be desirable to similarly process a material which is a good microwave absorber. This embodiment uses a good microwave absorbing material 650 and preferably desires to heat only a portion of that material. A metal tube 652 is used to shield the rod 650 from the microwave plasma. Tip 654 is the area that extends outside the shield. Plasma 656 is used to heat only tip 654 which extends outside the shield. This can be used to locally heat the tip of a good microwave absorber.

More generally, according to these embodiments, the good absorbing material is shielded by surrounding it with a poor microwave absorber such as a metal tube. A portion of the good absorbing material is left remaining outside the shielding tube. This allows plasma to be generated outside the tube, and focuses heating operations for good microwave absorbing materials.

Figure 6B:
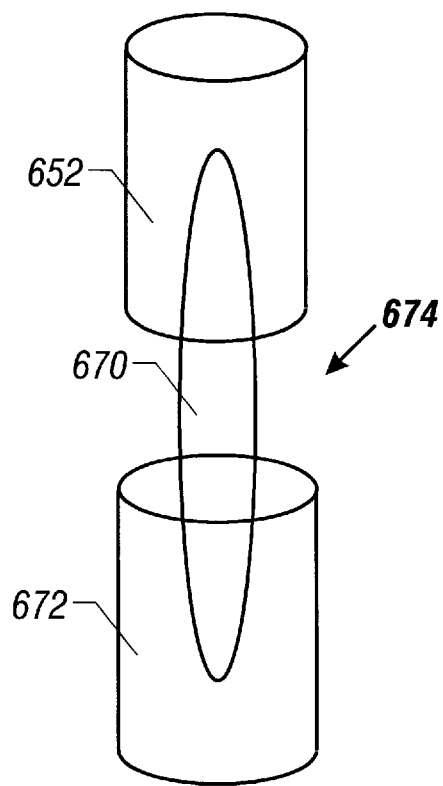
FIG. 6B is an alternative embodiment whereby some center portion of the workpiece is left unshielded.

An alternative embodiment is shown in FIG. 6B for heating a portion 670 of the workpiece that is spaced from the tip. This embodiment uses two separated shields 652, 672. An adjustable gap 674 between the shields 652, 672 can be adjusted to accommodate different portions of the rod.

As described above, the novel plasma heating techniques of this embodiment provide more efficient microwave processing of a much larger class of materials. This approach allows the processing of many more low absorbing materials that have high commercial value.

Second embodiment

The second embodiment of this invention uses a microwave excited plasma to enhance the combustion synthesis process.

The first embodiment described using a microwave plasma to pre-heat and join materials.

The techniques of the present invention facilitate heating of materials using microwaves. This opens the door to additional applications.

The present embodiment uses a microwave induced plasma and microwave energy to induce self-propagating high temperature synthesis (SHS). In so doing, the present inventors suggested igniting the center of the material using a microwave induced plasma to preheat the material and then using the microwave energy to ignite it thereby causing a spherical wavefront from the center outward, and a different preheating sequence than is possible in the prior art. While this system describes operation using center ignition, the plasma could be focused on the surface to ignite it there.

The SHS process which is preferably used according to a first aspect of the present embodiment follows the chemical reaction:

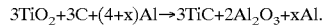

$$3TiO_2+3C+(4+x)Al \rightarrow 3TiC+2Al_2O_3+xAl.$$

The present inventors have studied this SHS process for various values of x, including x=0 and x=4, using slow and fast heating rates, and with and without the application of uniaxial pressure. Less than 50 watts was required to internally ignite the samples using a TE102 microwave cavity mode. Uniaxial pressures in the range of 200–1400 psi were continuously applied along the vertical axis of some of the processed samples as the SHS reactions were initiated. SEM photomicrographs clearly indicate differences in the formation of whiskers and other microstructural features in the products obtained from microwave and conventional hot wire techniques. The x=0 samples processed with fast and slow microwave heating rates reached higher densities than the conventionally processed samples.

SHS processes have generally been ignited at the surface of a material. The surface is heated by thermal radiation. This thermal energy can come from a laser beam, a heating coil situated close to the sample surface, or an isothermal furnace.

In these types of combustion synthesis methods, a temperature gradient is produced in the material with the surface of the material always being hotter than the center.

The inventors of the present invention have developed a completely different approach for igniting the SHS process using microwaves. When the microwave heating techniques of the present invention are used as the heating source, the microwaves will volumetrically heat non-conducting materials. The insulating properties lead to an inverted temperature gradient, whereby the center of the material is hotter than the surface.

In this approach, a combustion wavefront propagates radially outward from the center of the sample. This process can produce a completely different product morphology and lead to a more complete conversion of reactants.

As described above, the model reaction system used in this research was

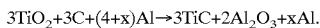

$$3TiO_2 + 3C + (4+x)Al \rightarrow 3TiC + 2Al_2O_3 + xAl.$$

where preferably x=0 and x=4.

For x=0, the combustion synthesis reaction product, TiC—$Al_2O_3$, does not contain any excess liquid aluminum. However, for the case x=4, an excess amount of liquid aluminum created by the combustion synthesis reaction infiltrates into the porous SHS ceramic composite, leading to a denser product. An aspect of the present invention uses these differing materials to produce a new product, and a new way of using SHS.

The incorporation of a ductile metal into a brittle ceramic composite matrix has considerable potential for substantial improvement in fracture toughness for both low and high temperature applications.

The importance of all these features include the preheating, and the use of plasma shields to enhance the operation. The present invention enables significant advantages in certain operations, including preheating low-loss materials for melting. The applications of this technique include joining rods, and preheating rods in a special way.

If the material being heated is a microwave absorber, microwaves will volumetrically heat the materials. Insulating materials, such as ceramics, will remain hot in the center because of the insulating character of the materials. The present embodiment teaches ignition of certain ignitable ceramic materials using an exothermic SHS reaction. The ignition causes a combustion wavefront. Importantly, this ignition according to the present invention is an exothermic reaction which occurs from the center outward. The ignition temperature is usually around 900° C. for the above SHS composition, but the reaction temperature is usually more than double that: for example between 2000° and 4000° C. for the composition being discussed above.

Ignition from the inside which is carried out according to the present invention produces a spherical wavefront from the interior point. This hybrid technique can include both radiation (plasma heating) and microwave volumetric heating. A plasma is preferably used, and both the plasma and the microwave volumetric heating are used to produce various types of temperature gradients in the sample prior to ignition. This controlled sample preheating can enhance the combustion of the entire sample as the SHS wavefront passes through it. As described above, the SHS reaction is self sustaining. However, the reaction prefers to operate at certain temperatures and gradients. These parameters vary depending on the materials being used. According to the present invention, the materials are preheated in a way that helps the reaction by having the right temperature in front of the wavefront at least at some points.

Figure 7:
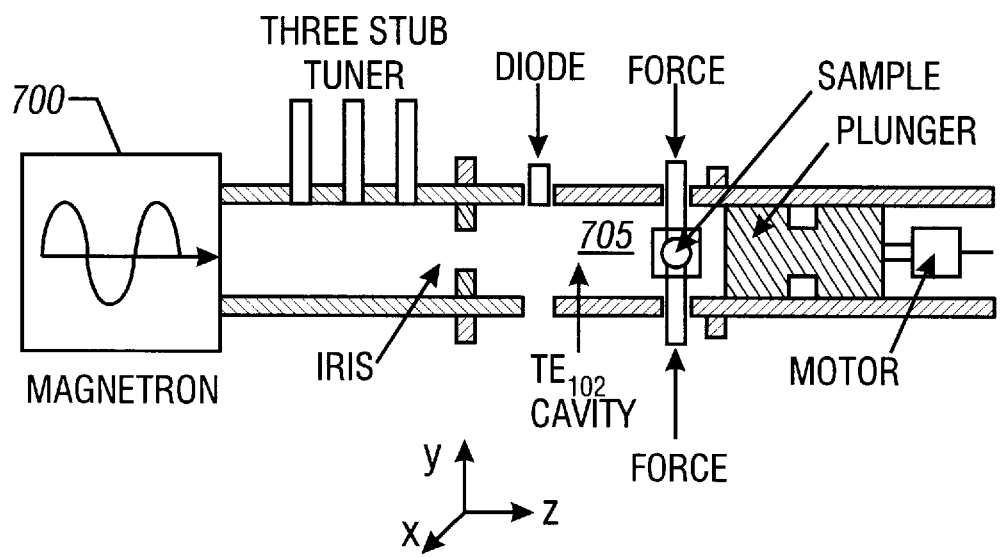
FIG. 7 shows a setup for SHS operations.

The SHS embodiment uses the setup shown in FIG. 7. A magnetron source 700 is used to excite a rectangular waveguide cavity 705 in the TE102 mode at 2.45 GHz. This mode has electric field maxima along the lines defined by z/Lz=0.25 and 0.75 and x/Lx=0.5. There is preferably a minimal spatial variation of the field in the y direction.

A cold-pressed cylindrical sample, 0.13 cm in diameter and 0.13 cm high, is placed on a quartz holder for one atmosphere isotropic ignition or inside a quartz tube with a piston on top to provide a vertical force for uniaxial pressure ignition.

Samples were placed approximately half way down the y axis (y/Ly=0.5) along one of the maximum E field lines (z/Lz=0.75 and x/Lx=0.5). The surface temperature of the sample was measured using a non-contact Everest Intercience IR thermometer (range −30°–1100° C.) and/or an Accufiber non-contact pyrometer (range 500°–2400° C.).

Densities of conventional and microwave processed samples were measured using Archimedi's principle. The microstructure of the synthesized product was then examined using a scanning electron microscope (SEM) interfaced with an energy-dispersive x-ray spectroscopy facility (EDS).

Cold-pressed green samples, weighing 3 grams with 50% theoretical density, were studied using both microwave and conventional processing methods. The microwave power was controlled to ignite the samples with x=0 using both fast and slow heating profiles.

Figure 8B:
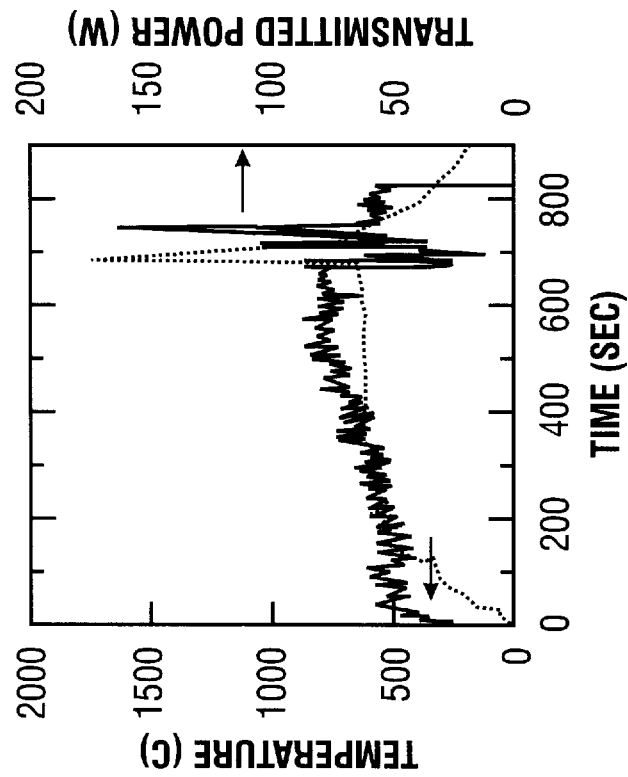
FIG. 8($a$) and FIG. 8($b$) show the time-temperature profiles for the fast and slow cases of SHS operations.
Figure 8A:
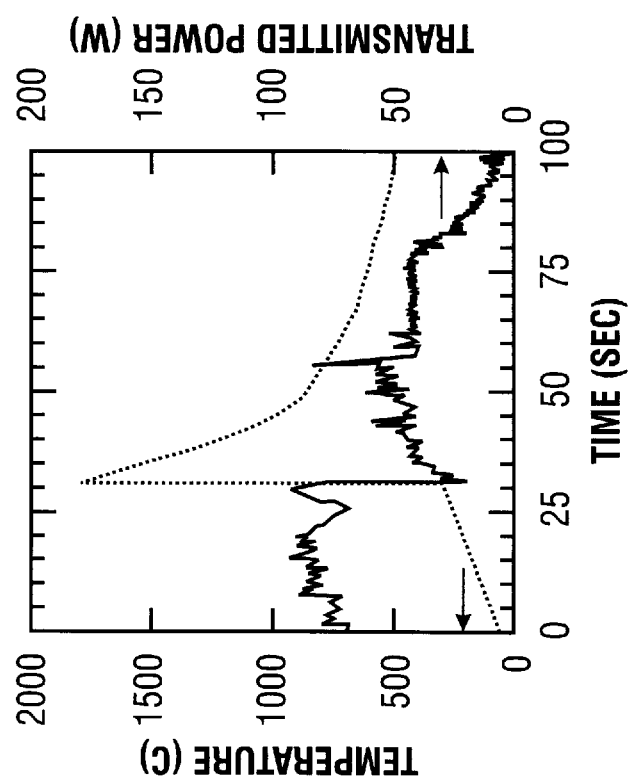

The time-temperature profiles for the fast and slow cases are shown in FIG. 8(a) and FIG. 8(b). The sample temperature was measured using both an Everest Interscience IR thermometer and an Accufiber non-contact pyrometer from the side holes of the cavity. Data from these two instruments were linked together to obtain a smooth curve. A higher starting power of ~ 75 watts was required to ignite the sample for the fast heating rate case, FIG. 8(a), as compared to ~ 50 watts starting power needed for the slow heating rate case, FIG. 8(b). The ignition temperature, as measured at the side of the sample surface, is lower (Ti=300° C.) for fast heating compared to slower heating (Ti=650° C.). The ignition temperature Ti, for x=0 samples measured by the conventional technique was ~ 1200° C. Thus, very high thermal gradients were produced during the microwave processing.

Figure 9A:
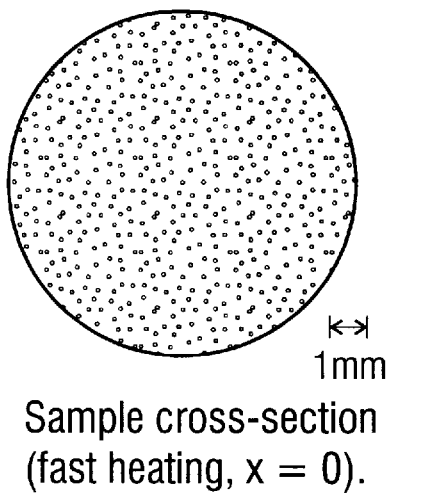
FIGS. 9($a$) and 9($b$) show photographs of a sample cross section cut through the center of the SHS product ignited using fast and slow heating responses.
Figure 9B:
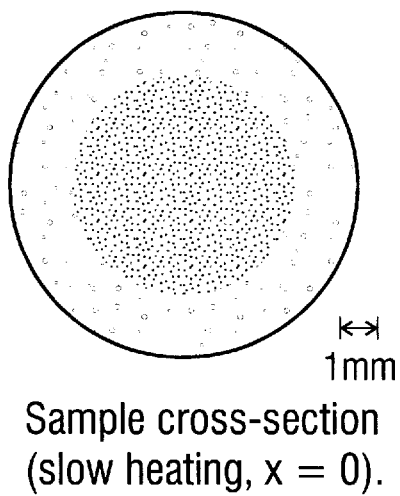

FIGS. 9(a) and 9(b) show photographs of a sample cross section cut through the center of the ignited product. The fast heating case was ignited near the center and produced equally distributed porosity except for a crack line from the center to the surface. This crack line is probably due to the high thermal gradient between the center and surface of the sample when it was ignited. The slower heating case, FIG. 9(b), has a milky outside surface and two different circular layers separated by a crack rim. These two layers are probably due to the initially melted aluminum (Tm=660° C.) being pushed toward the sample surface leading to a non-uniform distribution of the powders. When this sample was ignited, two different phases were formed and a crack rim developed due to the thermal expansion mismatch between the two adjacent circular layers. Also, the aluminum extruded toward the sample surface became a barrier for microwave penetration and thus inhibited the further ignition of powders. These results suggest that a fast microwave heating rate can insure a more complete chemical reaction of the mixed powders leading to a more uniform microstructure.

Figure 10:
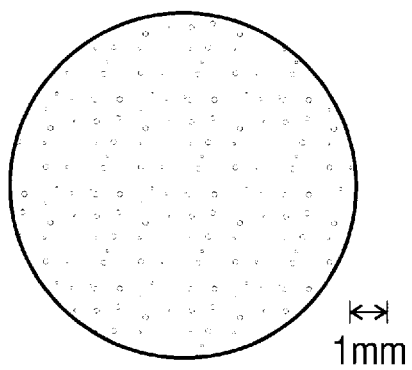
FIG. 10 shows a photomicrograph of ignition conditions.

For the x=4 case, slow microwave ignition was difficult due to arcing initiated by the excess aluminum at the sample surface. On the other hand, ignition using a fast microwave heating rate was successful and a uniform microstructure was observed as shown in FIG. 10. This photomicrograph clearly suggests that ignition was initiated in the lower right quadrant of the sample and the combustion wavefront then propagated radially outward.

Joining is an important application of microwave processing. Joining is commonly done by melting the two materials and then pressing them together. The melting and pressing could form a good bond. However, the two materials might still have different expansion properties after bonding. According to the present embodiment, the attachment of the materials are further enhanced by using a special interlayer between the two materials.

The special interlayer of this embodiment is called a functionally graded material ("FGM"). This functionally graded material includes a combination of various materials which affects the characteristics of the materials and the joints between the materials.

Figure 11:
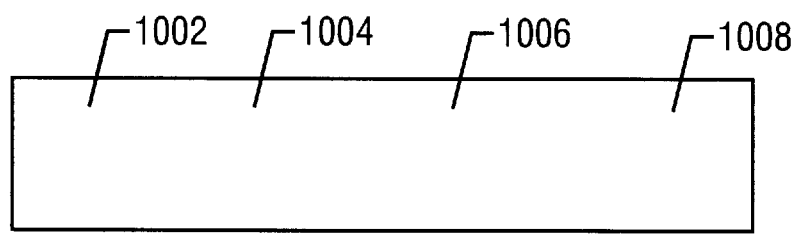
FIG. 11 shows a functionally graded material.

The functionally graded material includes a different material or material characteristic along the length of the material. The material shown in FIG. 11 has first end area 1002 with totally ceramic properties, and second end 1008 with more metallic properties. Areas 1004 and 1006 include different characteristics of these materials which are between the properties of the first and second ends.

For example, consider the chemical reaction described above:

$$3TiO_2 + 3C + (4+x)Al \rightarrow 3TiC + 2Al_2O_3 + xAl.$$

When x=1, there is little excess metal in the resulting material. If x is 2, 4 or 8 produces more metal in the material. The SHS material used according to this embodiment is preferably packed powders with excess material therein. Those excess materials produce an interlayer with varying characteristics. The SHS powder is doped with a metal. The amount of doped metal varies along the length of the layer.

Alternate materials can also be used.

The reaction of $$Ti + C + xNi = TiC + xNi$$

can be used to produce excess nickel.

The mismatch between coefficient of thermal expansion can be solved by using these functionally graded materials as interlayer elements for joining ceramics to metals for high temperature applications. Another important feature, moreover, is the improved bond that can be obtained from these materials. The part of the material that joins to some other material part is preferably like that other material part. For example, the portion of material that joins to the metal workpiece is more metallic, and the portion joining to the ceramic workpiece is more ceramic like. This provides better bonds.

An important advantage of this system is obtained from the operation—in which there is simultaneous development of the bond and formation of the functionally graded material. The graded material is packed into an interlayer between the materials to be joined and an exothermic reaction ignites the material to simultaneously (i.e., at the speed of the shock wave formed by the ignition) both form the FGM and bond it to both workpieces, to thereby bond together those workpieces.

Since the ignition forms a spherical wave as discussed above, starting at the interior of the material, two oppositely-directed waves are formed. Those waves encounter the two ends of the joint at substantially the same time—thereby forming and bonding these areas at the same time.

Although only a few embodiments have been described in detail above, those having ordinary skill in the art will certainly understand that many modifications are possible in the preferred embodiment without departing from the teachings thereof.

All such modifications are intended to the be encompassed within the following claims.

what is claimed is:

1. A microwave heating method, comprising:
   providing an object to be heated within a plasma, the object to be heated formed of a material which is not a uniform absorber of microwaves;
   igniting the plasma to heat the object to a predetermined temperature; and
   microwave heating the object once it has reached the predetermined temperature.

2. A method as in claim 1, wherein said object is formed with sharp edges at locations where igniting is to occur.

3. A method as in claim 2, wherein said providing locates said object at a preferred position in the cavity.

4. A method as in claim 3, wherein said preferred position is preferably a position that corresponds to a maximum field strength of the excited microwave cavity mode.

5. A method as in claim 2, further comprising flowing a dissociating gas into an area where the plasma is desired to enhance ignition of the plasma.

6. A method as in claim 1, further comprising a second object, spaced from the first object, and wherein said plasma is located in a space between the first and second objects to heat said objects.

7. A method as in claim 1, further comprising a second object, spaced from the first object wherein one of said objects is microwave absorbing, and the other is not, and comprising first heating one of the materials with the plasma, microwave heating the one material to form a microwave torch, and using the microwave torch to heat the other material.

8. A microwave heating method, comprising:
   forming a plasma;
   providing an object to be heated within the plasma, the object to be heated formed of a material which is a poor microwave absorber;
   exciting the plasma to heat the object to a predetermined temperature at which the material becomes a better absorber of microwaves;
   extinguishing the plasma once the object has been so heated; and
   microwave heating the object once it has reached the predetermined temperature and with the plasma turned off.

9. A method as in claim 8, further comprising a second object, spaced from the first object, and wherein said plasma is located in a space between the first and second objects to heat said objects.

10. A method of heating materials, comprising:
    using microwave energy and a microwave plasma to heat a material in such a way that a center of the material is heated to a higher temperature than a surface of the material;
    heating the center of the material to a point where the center of the material produces a high temperature combustion wave front from the center of the material outward; and
    joining the thus heated material with another material.

11. A microwave processing method, comprising:
    providing at least first and second materials to be processed;
    preheating the first material, and using a microwave to heat the first material until it undergoes an exothermic reaction; and
    using the heat from the exothermic reaction to heat the second material.

12. A method of heating a material comprising:
    forming a plasma in an area of a desired object to be heated; and
    using microwave energy to excite the plasma and heat the object to a desired temperature.

13. A method as in claim 12, further comprising flowing a dissociating gas into said area of said plasma.

14. A method as in claim 12, wherein said material is high purity alumina.

15. A method as in claim 12, further comprising terminating the plasma once the desired temperature is reached and thereafter using the microwave energy to heat the object directly.

16. A method as in claim 13, further comprising terminating the plasma once the desired temperature is reached and thereafter using the microwave energy to heat the object directly.

17. A method of joining a first material to a second material, comprising:

forming a plasma in an area of the first material;

using microwave energy to excite the plasma; and joining the first material to the second material.

18. A method as in claim 17, wherein the plasma is also in an area of the second material.

19. A method as in claim 17, further comprising positioning surfaces of the first and second materials near one another, and forming a plasma between the surfaces.

20. A method as in claim 19, further comprising localizing the plasma between the surfaces.

21. A method as in claim 17, further comprising continuing said using until the some portion of the first material is heated to a desired temperature, and then terminating the plasma and locally microwave heating the preheated first material to its melting temperature.

22. A method as in claim 20, further comprising continuing said using until the surfaces of the first and second materials are heated to a desired temperature, and then terminating the plasma and locally microwave heating the preheated surfaces.

23. A method as in claim 22, wherein said first material is a ceramic material, and said second material is a poorly microwave absorbing material.

24. A method of using microwaves and plasma to heat materials, comprising:

supplying a first material which can form a plasma into an area of a material to be heated;

exciting said plasma using microwave energy to heat said first material;

terminating supply of said first material; and subsequently to said terminating, using microwaves to locally heat the material to be heated.

* * * * *